United States Patent
Koertge et al.

(10) Patent No.: US 8,408,329 B2
(45) Date of Patent: Apr. 2, 2013

(54) PILING AND DRILLING RIG WITH FOLDABLE DEFLECTION APPARATUS

(75) Inventors: Stephan Koertge, Bludenz (AT); Alfred Koller, Altach (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 309 days.

(21) Appl. No.: 12/816,778

(22) Filed: Jun. 16, 2010

(65) Prior Publication Data
US 2010/0316451 A1    Dec. 16, 2010

(30) Foreign Application Priority Data
Jun. 16, 2009 (DE) .......................... 10 2009 025 084

(51) Int. Cl.
*E21B 7/02* (2006.01)
*E02D 11/00* (2006.01)
*B66C 23/26* (2006.01)

(52) U.S. Cl. ........................... 173/28; 405/232; 212/295

(58) Field of Classification Search ................ 405/231, 405/232; 37/468, 409, 410; 172/126–132; 212/175–177, 168, 295, 299; 173/28, 184, 173/185; 56/10.4
See application file for complete search history.

(56) References Cited

U.S. PATENT DOCUMENTS

| | | | | | |
|---|---|---|---|---|---|
| 2,383,172 | A | * | 8/1945 | Wagner et al. | 212/300 |
| 5,515,626 | A | * | 5/1996 | Holscher | 37/468 |
| 6,146,082 | A | * | 11/2000 | York | 414/723 |

FOREIGN PATENT DOCUMENTS

| | | |
|---|---|---|
| DE | 20011371 | 9/2000 |
| EP | 548900 A2 * | 6/1993 |
| EP | 1830006 | 9/2007 |
| JP | 59015122 A * | 1/1984 |
| WO | 2008/103031 | 8/2008 |

\* cited by examiner

*Primary Examiner* — David Bagnell
*Assistant Examiner* — Kyle Armstrong
(74) *Attorney, Agent, or Firm* — Dilworth & Barrese, LLP

(57) ABSTRACT

The present invention relates to a piling and drilling rig having a leader, a deflection apparatus for the deflection a rope which is pivotally connected to the head of the leader in a manner pivotable between at least one transport position and at least one working position, with the deflection apparatus being rotatable about an axis standing obliquely on the axis of extent of the leader.

20 Claims, 2 Drawing Sheets

PILING AND DRILLING RIG WITH FOLDABLE DEFLECTION APPARATUS

BACKGROUND OF THE INVENTION

The present invention relates to a piling and drilling rig having a leader, a deflection apparatus for the deflection of a rope which is pivotally connected to the head of the leader in a manner pivotable between at least one transport position and at least one working position.

Generic piling and drilling rigs are in particular used in special underground engineering applications. Such rigs essentially comprise the so-called load bearing structure and the mast or leader with a rotary drive and Kelly bar. Piped or unpiped bores can be carried out in the ground with the help of these rigs and the ground material which accumulates can be brought to the surface. In particular in rigs which are used in special underground engineering, the mast or leader frequently has a substantial height, with a deflection apparatus being arranged at its upper end which has the underlying object of deflecting the hoist rope of the piling and drilling rig in the direction of the piling or drilling axis in front of the leader or mast.

The mast or leader is moved from an almost vertical working position into a horizontal position in which the leader or mast is supported on the load bearing structure itself to facilitate the transport of the total construction apparatus. A small transport height is required in the horizontal transport position; that is, everything which projects beyond the permitted transport height has to be brought below this level by suitable measures. A transport length of the rig which is as short as possible has importance in addition to the aspect of the transport height, in particular with tight road conditions. The transport height or transport length of the rig is furthermore increased again by the deflection apparatus arranged at the head of the mast or leader in a manner directed to project obliquely upward in a transport position.

To optimize the transport height with respect to the deflection apparatus, the deflection apparatus is currently folded rearwardly below the permitted transported height with practically all commercial piling and drilling rigs.

A piece of instruction apparatus is known from EP 1 655 415 A1 at whose mast head a deflection device is arranged having a first, front deflection pulley and a second rear deflection pulley. To achieve the permitted transport height, the front deflection pulley can be pivoted about an axis transverse to the longitudinal axis of the mast behind the second deflection pulley.

A similar apparatus is known from DE 101 23 403 B4 in which a mast head is pivotably arranged at the upper end of the mast which can be pivoted from a working position into a transport position. In this respect, the mast head is likewise pivoted about an axis disposed transversely to the direction of extent of the mast from a position contacting the mast almost at a right angle into a position directed lengthways with respect to the mast. The same applies to the working apparatus of specification U.S. Pat. No. 5,269,107.

It is disadvantageous in the construction apparatus of specifications EP 1 655 415 A1, U.S. Pat. No. 5,269,107 and DE 101 23 403 B4 that the transport length increases by a not insubstantial part by the folding of the deflection apparatus/mast head.

In order likewise to reduce the transport length, rigs are known which can fold the upper part of the leader horizontally to the front in a separate, second step in order thereby to reduce the transport length. This procedure is, however, associated with a high time and installation effort since the mast head has to be released at a further screw connection or bolt connection to be able to fold it forward accordingly.

There is still a further possibility, in particular with piling and drilling rigs having a leader rotating device, in which the total leader or mast is rotated by 90° about a longitudinal axis in the horizontal transport position so that the deflection apparatus comes to lie beneath the transport height.

However, none of these approaches shows a satisfactory design in which a transport length is achieved which is as short as possible and the permitted transport height is observed. Since the erection and laying down of the mast or leader and the associated folding of the deflection apparatus is an action which is repeated regularly, this procedure should be able to be effected relatively easily and fast under construction site conditions; if possible it should be able to be carried out without any additional means.

SUMMARY OF THE INVENTION

It is therefore the object of the present invention to provide a piling and drilling rig in which a tiltable leader or mast having a deflection apparatus pivotally connected to the head end can be moved in as simple a manner as possible from an operating position into a working position in which the permitted transport height and a transport length which is as short as possible can be achieved.

This object is achieved in accordance with the invention in accordance with the description herein. In this piling and drilling rig, a leader and a deflection apparatus for the deflection of a rope are provided which is pivotally connected to the head of the leader in a manner pivotable between at least one transport position and at least one working position. The deflection apparatus is furthermore rotatable about an axis standing obliquely on the axis of extent of the leader. The deflection apparatus can be rotated due to the inventive rotatable pivotal connection to the upper end of the mast or leader such that the positioning of the deflection apparatus corresponds, in a transport position, to a position known in accordance with the prior art in which the deflection apparatus is folded rearwardly in a first step and the deflection apparatus is folded horizontally to the front in a separate, second step. The inventive rotation procedure of the deflection apparatus can in this respect also be effected relatively easily and fast under construction site conditions since the desired movement of the deflection apparatus can be adjusted in a single step. The release of separate screw connections or bolt connections of a second step such as is known from the prior art is furthermore omitted.

The leader is advantageously foldable between an approximately vertical working position and an approximately horizontal transport position. In the said working position, the leader extends along a vertical axis at the front side of the load bearing vehicle. In this respect, the deflection apparatus is rotatably pivotally connected to the upper end of the leader or mast, with the deflection apparatus being directed transversely to the mast or leader in the working position and extending to the front from the upper end of the mast/leader. In operation, it is the underlying object of the deflection apparatus to deflect the rope in the direction of the piling or drilling axis in front of the leader or mast. In detail, the rope course extends from the rear side of the mast or leader, starting from the load bearing vehicle, upwardly over the deflection apparatus at the head of the mast or leader and is deflected by it into the named piling or drilling axis direction along the front side of the leader or mast.

In a transport position, the leader or mast can be tilted rearwardly into a horizontal transport position. As a rule, in this respect, the tilted over leader or mast forms the topmost edge of the piling and drilling rig in the transport position, with the deflection apparatus aligned transversely to the mast or leader forming the topmost point of the total leader or mast.

The design in accordance with the invention of the axis of rotation of the rotatably pivotally connected deflection apparatus allows it to be rotated in the transport position such that the transport height and the transport length of the piling and drilling rig can be influenced.

The deflection apparatus is advantageously rotatable about the named axis in the transport position in a one step laterally to the bottom front at the horizontally disposed leader. The then current transport height of the piling and drilling rig can be reduced by means of this rotational movement to the topmost edge of the leader or mast and the rear/upper end of the mast or leader is no longer defined by the deflection apparatus, but rather by the pivotal connection point of the deflection apparatus at the mast or leader. In this respect, the transport position of the deflection apparatus after the deflection apparatus has been rotated about the axis of rotation in accordance with the invention corresponds to a solution known from the prior art in which the deflection apparatus was folded to the rear in a first step and was folded horizontally to the front in a separate, second step by means of a further release of a screw connection and bolt connection. It is conceivable in this respect that the deflection apparatus is rotatable by the rotation movement either to the right hand side or to the left hand side or to both sides to the leader/mast side.

Provision can be made that the transport length of the piling and drilling rig can be reduced by the rotational movement of the deflection apparatus in the transport position. In the most favorable variant, the transport length of the piling and drilling rig can in this respect be reduced approximately by the length of the deflection apparatus. A desired or permitted transport length of the rig can be achieved in an extremely advantageous manner by the rotation in accordance with the invention of the deflection apparatus about the mast or leader.

In a further advantageous embodiment of the invention, the transport height of the piling and drilling rig can be reduced by the rotational movement of the deflection apparatus in the transport position. In this respect, the transport height of the piling and drilling rig can be reduced by the rotational movement of the deflection apparatus such that the topmost edge of the rig is formed either by a lowered part of the deflection apparatus or, in the most favorable case, by the upper edge of the leader or mast.

It is extremely advantageous that the transport length and the transport height of the piling and drilling rig can be reduced by the rotational movement of the deflection apparatus in the transport position in one step. The assembly procedure and/or dismantling procedure of a piling and drilling rig, i.e. the positioning of the rig from a working position into a transport position is thereby substantially simplified and accelerated. The permitted transport height of the piling and drilling rig can consequently be achieved by the rotational movement in accordance with the invention by simple means and a transport length can be achieved which is as short as possible, which becomes increasingly important with tight road conditions.

It is furthermore advantageous that the deflection apparatus is rotatable about the axis into a transport position such that the transport width of the piling and drilling rig is not influenced by it. The transport width, i.e. the total width of the piling and drilling rig in the transport position, is determined solely by the chassis width of the rig or by other components.

BRIEF DESCRIPTION OF THE DRAWINGS

The present invention will now be explained in more detail with reference to an embodiment and to the drawings. There are shown.

DESCRIPTION OF THE PREFERRED EMBODIMENTS

Figure 1:
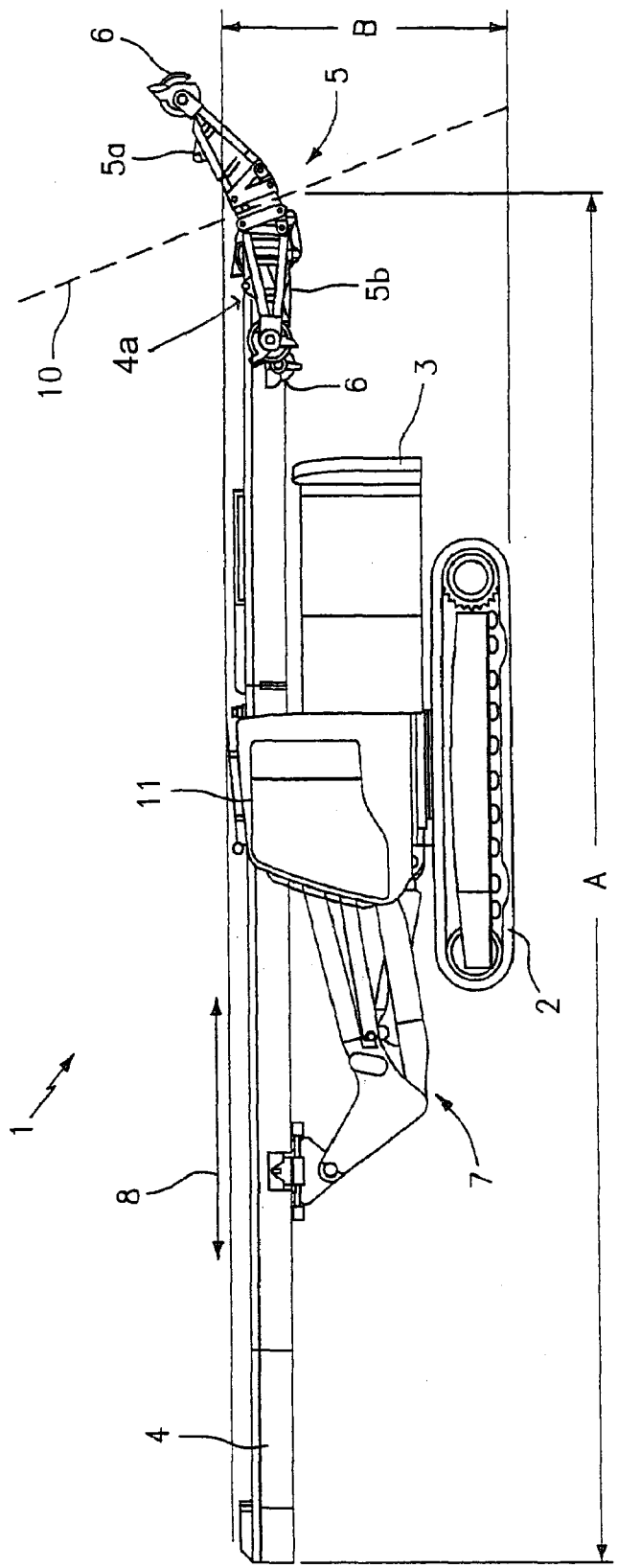
FIG. 1: a side view of the horizontal transport position of a piling and drilling rig in accordance with the invention.
Figure 2:
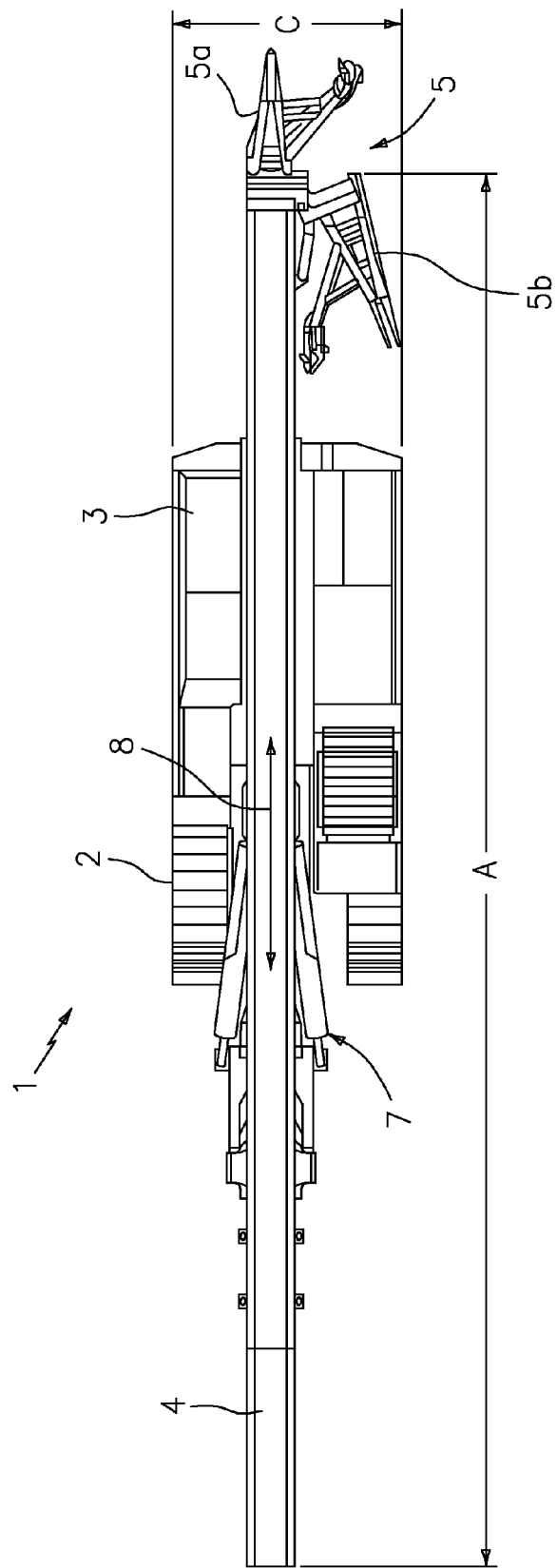
FIG. 2: a plan view of the piling and drilling rig in accordance with the invention in a horizontal transport position.

An embodiment of the piling and drilling rig in accordance with the invention is shown in FIGS. 1 and 2. The piling and drilling rig has an undercarriage 2 made as a crawler-mounted vehicle and a superstructure 3 arranged on the undercarriage 2. A leader 4 is mounted on the superstructure 3 with the aid of a holding apparatus 7. The leader 4 can be moved by means of the holding apparatus 7 from a vertically aligned working position, in which the longitudinal axis 8 of the leader 4 extends substantially vertically to the ground area and the leader 4 extends in front of the undercarriage 2 and the superstructure 3 of the piling and drilling rig 1, into a horizontally aligned transport position, in which its longitudinal axis 8 extends approximately horizontally with respect to the surface of the ground. The holding apparatus 7 is in this respect pivotally connected at one side to the leader 4 and at the opposite side to the superstructure 3 of the piling and drilling rig 1.

At the upper end 4a of the leader 4, a deflection apparatus 5 is rotatably pivotally connected in the form of a gallows or pulley head which in operation has the task in a working position to deflect the hoist rope into the piling and drilling axis in front of the leader 4. In this respect, the gallows 5 has a plurality of pulleys 6 for the deflection which guide the rope in the desired direction for the fastening of the piece of working equipment.

The two FIGS. 1 and 2 show a piling and drilling rig 1 in the transport position. On the movement of the leader 4 into the transport position, it is folded over the holding apparatus 7 rearwardly viewed from its upper end into a horizontal position, with the leader being stowed on the upper side of the superstructure 3 and the upper end of the leader 4 projects with the pivotally connected gallows 5 on the rear side of the piling and drilling rig 1 projecting against the direction of travel.

In accordance with the invention, the gallows 5 is rotatably pivotally connected about an axis 10 standing obliquely on the axis of extent 8 of the leader 4. In the operating position, the deflection pulleys 6 of the gallows 5 stand transversely to the longitudinal axis 8 of the leader 4, with at least one deflection pulley 6 coinciding tangentially with the piling and drilling axis of the piling and drilling rig 1.

In the transport position of the piling and drilling rig 1 shown in FIG. 1, the gallows 5 are reproduced once in their pivotally connected operating position 5a at the leader 4 and in a position 5b of the transport position in accordance with the invention rotated about the axis 10. It becomes visible in this respect that the then current transport height is reduced by the rotational movement in accordance with the invention of the gallows 5 about the axis 10 to the transport height B which is significantly marked by the upper edge of the leader 4 or by the operator's cabin 11 of the superstructure 3. However, not only the transport height, but rather also the transport length of the piling and drilling rig is also reduced to an optimized transport length A by this rotational movement. In this respect, the optimized transport length A extends from the lower side of the leader 4 up to the pivotal connection position of the gallows 5 at the upper end of the leader 4.

FIG. 2 shows a plan view of the piling and drilling rig in accordance with the invention, with the leader 4 likewise being located in the rearwardly folded transport position. The gallows 5 are rotated in the transport position laterally to the bottom front at the horizontally disposed leader 4 in one step by the rotational movement of the gallows 5 about the axis 10. In this respect, FIG. 2 specifically shows that the vehicle width C, which is defined by the width of the undercarriage 2 or of the superstructure 3, is not exceeded by the storage of the gallows 5 in the transport position 5b.

In the specific embodiment of FIGS. 1 and 2, the gallows 5 are rotated downwardly to the left about the axis 10 toward the leader 4. A rotation of the gallows to the right side to the right hand side of the leader 4 is here, however, likewise conceivable.

The invention claimed is:

1. A piling and drilling rig (1) having a foldable leader (4) having a front end and an opposite upper end (4a), a deflection apparatus (5) which is pivotally connected to the upper end (4a) of the leader (4) in a manner pivotable between at least one transport position (5b) and at least one working position (5a), wherein the deflection apparatus (5) is rotatable about an axis (10) oriented obliquely to a longitudinal axis (8) of the leader (4), wherein the axis (10) is oblique to a vertical orientation when the leader (4) is in the transport position.

2. The piling and drilling rig (1) in accordance with claim 1, wherein the leader (4) is foldable between an approximately vertical working position and an approximately horizontal transport position.

3. The piling and drilling rig (1) in accordance with claim 2, wherein the deflection apparatus (5) is rotatable to the transport position (5b) in a single lateral movement about the axis (10) and to a lower position closer to a front end of the horizontally disposed leader (4).

4. The piling and drilling rig (1) in accordance with claim 3, wherein a transport length (A) of the piling and drilling rig (1) is reduced by the rotational movement of the deflection apparatus (5) to the transport position.

5. The piling and drilling rig (1) in accordance with claim 4, wherein a transport height (B) of the piling and drilling rig (1) is reduced by the rotational movement of the deflection apparatus (5) to the transport position.

6. The piling and drilling rig (1) in accordance with claim 5, wherein a transport length (A) and the transport height (B) of the piling and drilling rig (1) is reduced in a single movement by the rotational movement of the deflection apparatus (5) to the transport position.

7. The piling and drilling rig in accordance with claim 6, wherein the deflection apparatus is rotatable about the axis (10) into a transport position (5b) such that a transport width (C) of the piling and drilling rig (1) is not influenced by it.

8. The piling and drilling rig (1) in accordance with claim 3, wherein a transport height (B) of the piling and drilling rig (1) is reduced by the rotational movement of the deflection apparatus (5) to the transport position.

9. The piling and drilling rig (1) in accordance with claim 2, wherein a transport length (A) of the piling and drilling rig (1) is reduced by the rotational movement of the deflection apparatus (5) to the transport position.

10. The piling and drilling rig (1) in accordance with claim 9, wherein a transport height (B) of the piling and drilling rig (1) is reduced by the rotational movement of the deflection apparatus (5) to the transport position.

11. The piling and drilling rig (1) in accordance with claim 2, wherein a transport height (B) of the piling and drilling rig (1) is reduced by the rotational movement of the deflection apparatus (5) to the transport position.

12. The piling and drilling rig (1) in accordance with claim 1, wherein the deflection apparatus (5) is rotatable to the transport position (5b) in a single lateral movement about the axis (10) and to a lower position closer to a front end of the leader (4) when said leader (4) is in a horizontal transport position.

13. The piling and drilling rig (1) in accordance with claim 12, wherein a transport length (A) of the piling and drilling rig (1) is reduced by the rotational movement of the deflection apparatus (5) to the transport position.

14. The piling and drilling rig (1) in accordance with claim 13, wherein a transport height (B) of the piling and drilling rig (1) is reduced by the rotational movement of the deflection apparatus (5) in the transport position.

15. The piling and drilling rig (1) in accordance with claim 12, wherein a transport height (B) of the piling and drilling rig (1) is reduced by the rotational movement of the deflection apparatus (5) to the transport position.

16. The piling and drilling rig (1) in accordance with claim 1, wherein a transport length (A) of the piling and drilling rig (1) is reduced by the rotational movement of the deflection apparatus (5) to the transport position.

17. The piling and drilling rig (1) in accordance with claim 16, wherein a transport height (B) of the piling and drilling rig (1) is reduced by the rotational movement of the deflection apparatus (5) to the transport position.

18. The piling and drilling rig (1) in accordance with claim 1, wherein a transport height (B) of the piling and drilling rig (1) is reduced by the rotational movement of the deflection apparatus (5) to the transport position.

19. The piling and drilling rig (1) in accordance with claim 1, wherein a transport length (A) and the transport height (B) of the piling and drilling rig (1) is reduced in one step by the rotational movement of the deflection apparatus (5) to the transport position.

20. The piling and drilling rig in accordance with claim 1, wherein the deflection apparatus is rotatable about the axis (10) into a transport position (5b) such that a transport width (C) of the piling and drilling rig (1) is not influenced by it.

* * * * *